UNITED STATES PATENT OFFICE.

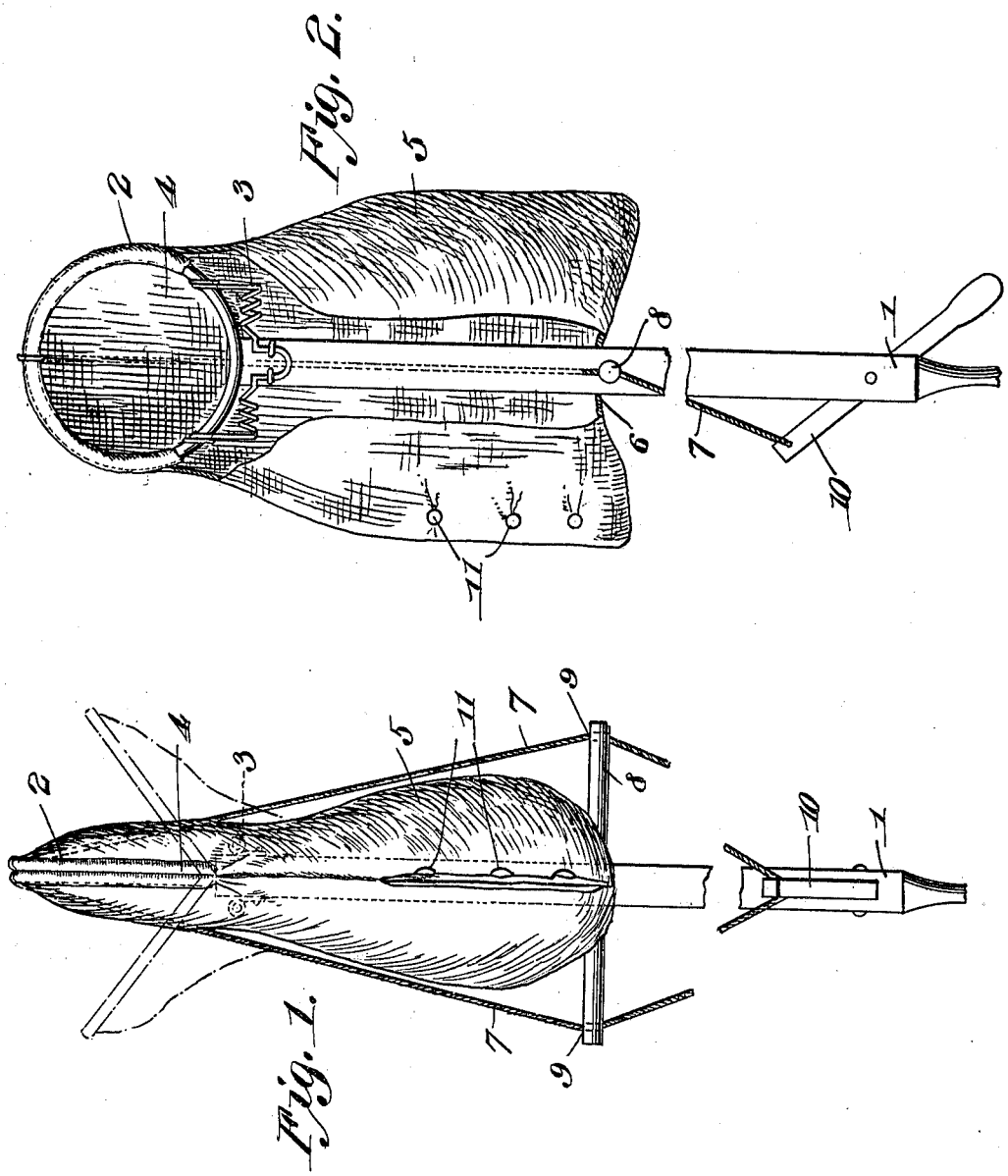

ALPHERD P. WELLS, OF EAST STONE GAP, VIRGINIA.

FRUIT-PICKER.

978,683.  Specification of Letters Patent.  Patented Dec. 13, 1910.

Application filed March 19, 1910. Serial No. 550,318.

*To all whom it may concern:*

Be it known that I, ALPHERD P. WELLS, a citizen of the United States, residing at East Stone Gap, in the county of Wise and State of Virginia, have invented new and useful Improvements in Fruit-Pickers, of which the following is a specification.

This invention relates to fruit pickers of that type provided with co-acting jaws arranged at the mouth of a bag so as to close over the fruit and permit the latter to be pulled off the branch and drop into the bag.

The invention has for one of its objects to improve and simplify the construction and operation of devices of this character so as to be reliable and efficient in use, of durable and substantial construction, and readily manipulated.

Another object of the invention is the provision of a novel arrangement of fruit receptacle or bag, spring closed jaws and operating means for the jaws.

With these objects in view, and others as will appear as the description proceeds, the invention comprises the various novel features of construction and arrangement of parts which will be more fully described hereinafter and set forth with particularity in the claims appended hereto.

In the accompanying drawing, which illustrates one embodiment of the invention; Figure 1 is a front view of the apparatus showing the jaws in different position by full and dotted lines; and Fig. 2 is a side view thereof.

Similar reference characters are employed to designate corresponding parts throughout the several views.

Referring to the drawing, 1 designates the handle of the device which is of any desired length and has supported on its upper end a pair of co-acting hoop-shaped jaws 2 that are hingedly mounted on the handle and are provided with closing springs 3. These jaws are disposed at the mouth 4 of the bag or receptacle 5 into which the fruit drops after being picked, the bag being of any desired capacity so that it will not have to be emptied until practically the entire tree is picked. The bag has a hole 6 in its bottom so as to permit the handle to pass centrally into the bag.

The operating device for the jaws comprises a pair of pull strings or ropes 7 which have their upper ends secured to the topmost portion of the hoops or loops that form the jaws and these ropes pass downwardly through a cross bar 8, which is secured to the handle and projects from opposite sides thereof, the cross bar being so positioned that it forms a support for the bag or receptacle 5 so that the weight of the fruit contained in the latter will not be sustained by the jaws to thereby permit free closing of the same. The ropes 7 slide through openings or equivalent guiding devices 9 in the end of the cross bar and are both connected to a lever 10 fulcrumed near the grip portion of the handle 1. When the jaws are closed, the front end of the lever will be down and it is merely necessary to push the front end upwardly to exert a draft on the ropes or elements 7 in a direction for opening the jaws. As soon as pressure is removed from the lever, the jaws will close automatically.

In operation, the device is held by one hand gripping the lower end of the handle while the other hand is used to manipulate the lever. In order to pick the fruit, the operator presses upwardly on the lever to hold the jaws open so that the bag can be placed directly under the fruit with the jaws disposed at opposite sides thereof. When held in this position, the lever is released so as to permit the jaws to be closed over the fruit and then by downward pull on the handle, the stem will be severed from the branch and the fruit dropped into the receptacle. This operation is repeated for picking each piece of fruit and when the bag is filled, it can be opened by loosening the buttons 11 at one side of the bag near the bottom to thus permit the fruit to pass out into a basket or other receptacle.

From the foregoing description taken in connection with the accompanying drawing, the advantages of the construction and of the method of operation will be readily apparent to those skilled in the art to which the invention relates, and while I have described the principle of operation of the invention together with the device which I now consider to be the best embodiment thereof, I desire to have it understood that the apparatus shown is merely illustrative and that such changes may be made when desired as are within the scope of the claims.

What I claim as new and desire to secure by Letters Patent is:—

1. A fruit picker comprising a handle, a closed-bottom bag into which the handle projects, self-closing jaws at the upper end of the handle and projecting upwardly therefrom, said jaws being mounted to swing outwardly and downwardly to open position about an axis extending transverse to the handle, a cross bar disposed under the bottom of the bag and arranged at right angles to the axis on which the jaws swing, said cross bar having openings in its ends, flexible elements extending through the openings of the cross bar and upwardly therefrom to connect with the said jaws and also extending downwardly from the cross bar, and an operating lever mounted on the handle below the bag and cross bar and connected with the lower ends of the said elements.

2. A fruit picker comprising a handle, a receiving bag through the bottom of which the upper end of the handle extends, self-closing jaws mounted on the handle and connected with the mouth of the bag to close the said mouth and to support the upper portion of the bag, flexible elements connected with the jaws for opening the same, and a single device mounted on the handle at a point below the bag and below the jaws to form guiding means for the said elements and also supporting means for the bottom of the bag.

3. A fruit picker comprising a handle, a bag having an opening at its bottom and a mouth at its top, said handle extending into the bag through the said opening, a cross bar on the handle at a point under the bag to support the bottom of the latter, jaws at the mouth of the bag and supporting the upper part of the bag, and actuating elements connected with the jaws and guided by the cross bar.

4. A fruit picker comprising a handle, a bag having an opening at its bottom and a mouth at its top, said handle extending into the bag through the said opening, a cross bar on the handle at a point under the bag to support the bottom thereof, jaws at the mouth of the bag and supporting the top portion thereof, actuating elements connected with the jaws and guided by the cross bar, and a common actuator mounted on the handle and to which both elements are connected.

5. A fruit picker comprising a handle, selfclosing jaws mounted thereon, a bag connected with the jaws, a transverse member on the handle forming a bottom support for the bag, flexible elements connected with the jaws and guided by the member, and means for actuating the elements to open the jaws.

6. A fruit picker comprising a closed-bottom bag having a mouth, jaws at the mouth, a handle supporting the jaws, a cross bar secured to the handle at a point under the bottom of the bag, and supporting the bottom portion of the latter, a flexible element connected with each jaw, means on the cross bar for guiding the elements, and an actuating device mounted on the handle at a point below the bar and to which both elements are connected.

7. A fruit picker comprising a bag having a mouth, a handle extending into the bag, jaws mounted on the upper end of the handle for opening and closing the mouth of the bag and for supporting the top portion of the latter, springs for closing the jaws, a cross bar secured to the handle at a point under the bag to support the bottom thereof, guiding means on the ends of the cross bar, flexible elements connected with the jaws and extending downwardly therefrom through the said guiding means, and an operating lever mounted on the handle and connected with the lower ends of the elements to operate through the latter to open the jaws by an upward movement of one end of the lever.

In testimony whereof I affix my signature in presence of two witnesses.

ALPHERD P. WELLS.

Witnesses:
   Jno. W. Chalsdey,
   J. M. M. Lemore.